United States Patent Office 3,649,597
Patented Mar. 14, 1972

3,649,597
**DIMETHYLHYDANTOIN-FORMALDEHYDE-
ACETALDEHYDE TERPOLYMERS**
William O. Henley, Jr., Montoursville, Pa., assignor to
Glyco Chemicals, Inc., New York, N.Y.
No Drawing. Filed Oct. 17, 1968, Ser. No. 768,551
Int. Cl. C08g 9/24; A61k 7/10
U.S. Cl. 260—67.5                          7 Claims

ABSTRACT OF THE DISCLOSURE 5,5 - di(lower)alkylhydantoin - formaldehyde-acetaldehyde terpolymers, wherein each lower alkyl group has from one to two carbon atoms and the acetaldehyde, formaldehyde, and hydantoin moieties are in the ratio of from about 0.05 to about 0.5 mol of the acetaldehyde moiety per about 0.95 to about 0.5 mol of the formaldehyde moiety per mole of the dialkylhydantoin.

---

This invention is that of certain 5,5-di(lower)alkylhydantoin-formaldehyde-terpolymers, wherein each lower alkyl group has from one to two carbon atoms, and the acetaldehyde, formaldehyde, and hydantoin moieties are in the ratio of from about 0.05 to about 0.5 mol of the acetaldehyde moiety to from about 0.95 to about 0.5 mol of the formaldehyde moiety per mol of the dialkylhydantoin moiety. Also part of the invention is hair fixative spray formulations containing any of these terpolymers dissolved in ethanol as well as aerosol compositions of these formulations with a polyhalogenohydrocarbon aerosol propellant having from one to two carbon atoms and fluorine as one of its halogens.

The 5,5 - dimethylhydantoin-formaldehyde resin has been used in aqueous alcohol solution as a hair spray. However, users have found that such hair sprays manifest an undesirable odor of formaldehyde with accompanying undesirable taste resulting from its inhalation. Thus, currently very little, if any, of hair sprays including that resin are consumed at least in the United States.

Acetaldehyde likewise has an undesirably pungent odor differing somewhat from formaldehyde in being fruity. However, acetaldehyde does not polymerize with a di(lower)alkylhydantoin such as 5,5-dimethylhydantoin to provide a corresponding resin such as occurs with formaldehyde.

According to this invention, it was found that replacement of the formaldehyde only in part, for example, even with as little as about 0.05 mol percent to about equimolar ratio, by acetaldehyde not only enables the corresponding mixture of formaldehyde and acetaldehyde to polymerize with the desired di(lower)alkylhydantoin, but also surprisingly the resulting dialkylhydantoin-formaldehyde-acetaldehyde terpolymer lacks any pungent odor such as the undesirable formaldehyde odor or taste. Thus, hair spray fixative formulations containing such terpolymer dissolved as in ethanol lack the undesirable feature of manifesting formaldehyde odor and taste as occurs from use of the dimethylhydantoin formaldehyde resin.

A feature of the invention then is its provision of a new class of these useful certain di(lower)alkylhydantoin-formaldehyde-acetaldehyde terpolymers.

A further feature is that this class of terpolymers can provide advantageously useful hair spray fixative formulations having incorporated therein a terpolymer of the invention dissolved in ethanol.

Still another feature of the invention is that the resulting ethanol solution hair spray formulations containing a terpolymer of the invention are free of release of undesirable formaldehyde odor and accompanying undesirable taste.

The terpolymers of the invention are transparent, clear to pale yellow, brittle resins usefully soluble in water and in ethanol, and applicable as just earlier noted, for example, as the effective ingredient in hair treating preparations such as fixative hair sprays.

Considered broadly, the terpolymers of the invention are constituted as defined in the opening paragraph of this specification. They are produced with a softening point from at least about 50° C. to 90° C. (all temperatures herein are in centigrade) and beneficially from about 55° to 85° and desirably effective at from about 60° to 85°. In general, they manifest practical solubility in water and in ethanol.

Generally, the terpolymers of the invention are prepared by heating a mixture of the selected di(lower)alkylhydantoin with the required proportions of acetaldehyde and formaldehyde in the presence of a catalytically effective mixture of zinc acetate, borax and monosodium metaphosphate monohydrate (in a reaction vessel equipped with a thermometer well, suitable fluid inlet and outlet, and sampling entry) under alkaline conditions to a temperature initially high enough to liberate water from the reaction, e.g. a little above 100° as about 105°, and there beneficially sparging the reaction mixture with air to enhance water removal. Heating and agitation of the reaction mixture is continued while allowing the water to escape, and with the temperature increasing as evolution of water diminishes. When the temperature reaches about 150°, it is advisable to draw a sample to determine the product's softening point and to continue such sampling conveniently about every half hour while continuing heating to raise the temperature above 160 and between about 170° and 180° and continuing the sampling until the product has obtained the desired softening point.

The dialkylhydantoin - formaldehyde-acetaldehyde-terpolymers of the invention advantageously are compounded in an amount sufficient of a suitable denatured alcohol to provide a non-flaking deposit of such a terpolymer on the hair when the solvent has evaporated from the resulting hair spray applied to the hair.

The resulting solution of the specific terpolymer, for example, from about 5 to about 6 percent, in the ethanol can include additives such as are commonly included in hair spray formulations to enhance the appearance of the hair such as a silicone oil as the "DC–556" (a liquid polyphenylmethylsiloxane, product of Dow Corning Corporation) to enhance freedom from tackiness, a plasticizer such as dimethylphthalate, or the "Ethylan" mixture of isopropyl esters of the fatty acids having from 10 to 20 carbons with the lanolin acids, a blending agent and sheen enhancer as cetyl alcohol (which incidentally serves to enhance humidity resistance), or "Cellin" oil (an alkyl branched fatty acid ester) imparting a natural oil lustre to the hair.

The terpolymers of the invention and their production are illustrated by, but not restricted to, the following examples:

EXAMPLE 1

One mol of dimethylhydrantion with one-half mol each of acetaldehyde and formaldehyde Thirty-four hundred and seventy-six grams (27.13 mols) of dimethylhydantion, 599 grams (13.6 mols) of acetaldehyde, 1103 g. of 37% formaldehyde (aqueous) solution (13.59 mols of dry formaldehyde), 803 g. of tap water, 4.3 g. monosodium metaphosphate monohydrate (0.096% of the total weight of dry reactants), 12.9 g. borax (0.288% of total weight dry reactants), and 1.9 g. zinc acetate dihydrate (0.042% of total weight of dry reactants) were mixed in a suitably equipped reaction vessel and heated carefully to 105° C., with watching to prevent foamover while water was boiling out of the batch. At that point sparging of the reaction mixture with air to enhance removal of the water was begun.

Heating and stirring was continued and the reaction temperature raised to 169–172° and continued for 5 hours and 25 minutes when it reached a constant softening point at 62°. The still liquid terpolymer was emptied from the reaction flask to a stainless steel container. On cooling the yellow, transparent, brittle resin reaction product was soluble in alcohol, also in water and showed the 62° softening point and molecular weight 390 (yield was 80.3% of total weight of reactants).

A 5% by weight solution of this terpolymer in SDA–40 alcohol solution spread thinly over a glass surface, after evaporation of the alcohol showed that the terpolymer is film forming, and also when sprayed manifested no undesirable odor or taste such as that of formaldehyde. SDA–40 alcohol is composed of 3 ounces of the alkaloid brucine or brucine sulphate dissolved in on-eighth gallon of denaturing grade tertiary butyl alcohol added to 100 gallons absolute ethanol.

EXAMPLE 2

Mixed dimethylhydantoin and methylethydantoin with formaldehyde and acetaldehyde Sixty-four grams (0.5 mol) of 5,5-dimethylhydantoin, 71 g. (0.5 mol) of 5-methyl-5-ethylhydantoin, 57 g. of 37% formaldehyde aqueous solution (0.7 mol HCHO), 13.2 g. (0.3 mol) acetaldehyde, 42 g. tap water, 0.2 g. monosodium metaphosphate monohydrate, 0.6 g. borax, and 0.1 g. zinc acetate dihydrate were mixed in a suitably equipped reaction flask and heated to 105° when the reaction mixture was sparged with air. The temperature was increased cautiously to 170° over 15 minutes, then to 175° over about 20 minutes and continued at between 175 to 180° for 3 hours and 35 minutes when the reaction product showed a softening point of 63°. The liquid terpolymer, poured from the reaction flask while still hot, cooled in the pan to a yellow, transparent resin (yield 78.1% on solid reactants) with a softening point of 63°.

EXAMPLE 3

0.25 mol acetaldehyde, 0.75 mol formaldehyde per mol methylethylhydantoin 142.2 grams (1 mol) of 5-methyl-5-ethylhydantoin, 11.0 g. (0.25 mol) of acetaldehyde, 60.8 g. of 37% formaldehyde aqueous solution (0.75 mol HCHO), 0.6 g. borax, 0.2 g. monosodium metaphosphate monohydrate, and 0.1 g. zinc acetate dihydrate were mixed with 32.0 g. of tap water in a reaction flask and heated over about 50 minutes to 105° when the reaction mixture was sparged with air. The temperature was increased cautiously to 170° over 20 minutes and held there for about 55 minutes and then raised to 180° in the next 15 minutes and continued at between 179 and 180 for two and three-quarter hours when the reaction product showed a softening point of 54°. The liquid polymer, poured into a cooling pan, solidified to a yellow, transparent resin (yield 79% on total reactants) with no change in softening point.

EXAMPLE 4

0.2 mol acetaldehyde, 0.8 mol formaldehyde per mol methylethylhydantoin

Except for using only 8.8 g. (0.2 mol) of acetaldehyde and 65 g. of the 37% formaldehyde aqueous solution, and all of the rest of the materials without change from Example 3, the reaction mixture was heated over an hour and twenty-two minutes to 170°, over about the next 20 minutes to 176° and over the next half hour to 180°. It then was maintained at between about 178 and about 180° for about two and three-quarter hours, during the last hour of which the reaction product showed a softening point of 57°. The poured out and cooled terpolymer was a yellow transparent resin (yield 77.7% on starting reactants) with no change in softening point.

EXAMPLE 5

0.3 mol acetaldehyde, 0.7 mol formaldehyde per mol dimethylhydantoin 562.6 pounds (4.40 mols) of 5,5-dimethylhydantoin, 249.5 lbs. of 37% formaldehyde aqueous solution (3.07 mols HCHO), 58.0 lbs. (1.31 mols) of acetaldehyde, 94.1 lbs. of tap water, one lb. of monosodium metaphosphate monohydrate, 3 lbs. of borax, and 0.42 lb. of zinc acetate dihydrate were charged into a reaction kettle (equipped as earlier above described) and heated carefully to 105°. The air then was slowly turned on to sparge the water boiling out of the reaction mix.

The heating was watched closely between 100° and 110° to avoid foamover while water was boiling out of the batch, the temperature then was increased and after it reached 150°, a sample was drawn for softening point test and repeated about every half hour while continuing to heat to 160 to 170° until a softening point of 65° was attained. The heating was continued at about 170° until the softening point of 70° was reached and maintained. The still liquid, hot reaction product was unloaded through a heated line into stainless steel trays. The cooled solidified product was a light yellow, transparent resin with no change in softening point, and on solution (e.g. in ethanol) showed no insolubles.

The dimethylhydantoin of Examples 1 and 5 can be replaced in any part or as a whole by an equivalent molal quantity of 5,5-diethylhydantoin and the reaction repeated in each case to give the corresponding 5,5-diethylhydantoin-formaldehyde-acetaldehyde-terpolymer resin end product with correspondingly relatively similar properties. So also, in Example 2 either the dimethylhydantoin or the 5-methyl-5-ethylhydantoin can be replaced as a whole or in any part by 5,5-diethylhydantoin and the reaction repeated to provide the corresponding respective mixed di(lower)alkylhydantoin-formaldehyde-acetaldehyde-terpolymer resin.

Also, in any of the Examples 1 through 5 as well as in any of the just above described modifications of them, the respective ratio of the acetaldhyde to formaldehyde can be changed from anywhere within the range of 0.05 mol of acetaldehyde per 0.95 mol of formaldehyde to equimolal amounts of each of them, and the reactions conducted to obtain respectively the corresponding 5,5-di-(lower)alkylhydantoin - formaldehyde - acetaldehyde-terpolymer resins.

Thus, all of the indicated possible modifications of any of the foregoing specific examples and modifications of them provided by substitution in the various ways directed in the two just preceding paragraphs are to be considered as if they appear herein as respectively separate, fully set forth complete examples, thereby to avoid unduly prolonging this specification.

In each case a simple laboratory test batch or but a few such batches may need to be prepared to provide the conditions for attainingg the desired approximate softening point in the end product terpolymer, and to allow for such minor adjustment in, for example, temperature and time toward that end. Ordinarily, extending the time can increase the softening point with corresponding molecular weight increase unless consecutive test samples show no change in softening point. Then too, increasing the ratio of acetaldehyde to formaldehyde will tend to produce a lower softening point end product.

Solutions of the terpolymers of the invention in ethanol for use in hair sprays are illustrated by, but not restricted to, the following formulations in parts by weight, for which there was first prepared a stock solution of 71 parts of, for example, the terpolymer of Example 5 in 29 parts of SDA–40 denatured alcohol. That stock solution is identified in the following examples briefly as "71% EX-5 terpolymer in SDA-40":

Example 6

| | Parts |
|---|---|
| SDA-40 alcohol | 90.73 |
| 71% EX-5 terpolymer in SDA-40 | 9.27 |

Example 7

| | |
|---|---|
| SDA-40 alcohol | 90.73 |
| 71% EX-50 terpolymer in SDA-40 | 8.7 |
| "DC-556" silicone oil | 0.08 |

Example 8

| | |
|---|---|
| SDA-40 alcohol | 91.89 |
| 71% EX-5 terpolymer in SDA-40 | 7.51 |
| "DC-556" silicone oil | 0.22 |
| Dimethylphthalate | 0.38 |

Example 9

| | |
|---|---|
| SDA-40 alcohol | 91.98 |
| 71% EX-5 terpolymer in SDA-40 | 7.02 |
| "DC-556" silicone oil | 0.13 |
| Dimethylphthalate | 0.38 |
| Cetyl alcohol | 0.56 |

Example 10

| | |
|---|---|
| SDA-40 alcohol | 92.07 |
| 71% EX-5 terpolymer in SDA-40 | 7.05 |
| "DC-556" silicone oil | 0.13 |
| Dimethylphthalate | 0.25 |
| "Ethylan" (liquid lanolin) | 0.50 |

The terpolymer of Example 5 used in any of the preceding Examples 6–10 can be replaced in part, say, to the extent of possibly 30% by some other substantially non-tacky film-forming resin also soluble in alcohol or in a readily atmospheric temperature volatile solvent miscible with ethanol, inert to the terpolymer in such solution and non-toxic to the scalp in its concentration in the formulation. Such other thus compatible resin can be an acrylic polymeric resin, for example, "Dicrylan 325–50" which is an acrylic polymeric resin product of Ciba Chemical & Dye Co. Such formulations are illustrated by, but not restricted to, the following:

Example 11

| | Parts |
|---|---|
| SDA-40 alcohol | 90.62 |
| 71% EX-5 terpolymer in SDA-40 | 8.18 |
| "Dicrylan 325–50" (Ciba) | 0.4 |
| "DC-556" silicone oil | 0.80 |

Example 12

| | |
|---|---|
| SDA-40 alcohol | 92.15 |
| 71% EX-5 terpolymer in SDA-40 | 6.35 |
| "Dicrylan 325–50" (Ciba) | 1.0 |
| Cetyl alcohol | 0.25 |
| "Cellin" oil | 0.25 |

The "Dicrylan 325–50" of Examples 11 and 12 can be replaced by any other ethanol or otherwise soluble resin of the type broadly described in the paragraph following Example 10.

The terpolymer of Example 5 used in the foregoing Examples 6–12 can be replaced in part or as a whole in any of Examples 6–12 by any other terpolymer of the invention within the scope described in the three paragraphs following the end of Example 5.

Each such thus now referred to such modification of any of Examples 6–12 then provided by the here described substitution in those examples is to be considered as if it appears herein as a respectively separate, fully set forth complete example, thereby to avoid undue extension of this specification.

Each fixative hair spray formulation of Examples 6–12 and the resulting additional examples from the here described modifications of them, can be applied to the hair by a suitable known spraying device. Alternatively, each of those many fixative hair spray formulations hereof can be combined with a suitable compatible aerosol propellant inert to the fixative hair spray formulation content and in such proportion to the propellant that when their mixure is discharged from an aerosol pressure container, the mixture can be propelled from the open valve and at a pressure adequate for an effective spray of the fixative formulation to reach the hair.

Thus, for example, any formulation of Examples 6–12 and of the herein-described modifications thereof can be admixed in the ratio of from about 10 to about 35 parts of said formulation to from about 65 to about 90 parts of the propellant as a relatively non-toxic chloro- and fluoro-substituted methane or ethane, having at most only one non-replaced hydrogen and a molecular weight of from about 103 to about 204 and being non-reactive with the film-forming hair fixative formulation comprising the terpolymer of the invention dissolved in ethanol alone or containing also any one or more of the additives of the type shown in Examples 7–12 and by the earlier above general description of them.

The applicable aerosol propellants include the halogen substituted methanes and ethanes, wherein both of the halogens chlorine and fluorine are linked to each carbon and with a total of at least three halogen atoms linked to the carbon in methane and each of the carbons in ethane. The chemical identity of a number of illustrative examples of these applicable aerosol propellants are for brevity of reference accompanied by their respective trademarks of one of the manufacturers. Thus, for example, illustrative applicable methanes are dichlorodifluoromethane ("Freon-12"), trichloromonofluoromethane ("Freon-11"), both of which have each of the carbon valences linked to a halogen, also dichloromonofluoromethane ("Freon-21") and monochlorodifluoromethane ("Freon-22"). The latter two exemplify methanes having one non-replaced hydrogen.

In the applicable chloro- and fluoro-ethanes, each of the other valences of each of the two carbons is linked to one of these two halogens, for example, 1,2-dichlorotetrafluoroethane ("Freon-114"), and 1,1-dichloro-1-fluoro-2-chloro-difluoroethane ("Freon-113"). Others deemed also effective have relatively similarly applicable boiling points and evaporation rates for use either alone or admixed with any one or more of the others of the same type.

So far as presently indicated, "Freon-12" may be used alone as the propellant, and at times so also may be "Freon-114" although the latter evaporates more slowly than does "Freon-12." Thus, for many of the hair fixing compositions of the invention, it is more advantageous to employ suitable mixtures, often approaching about equal parts, of one of these propellants which evaporates more rapidly than most of the others admixed with one or more of the more slowly evaporating propellants. An advantageously effective example is 40 parts of "Freon-12" with 60 parts of "Freon-114." A good example includes equal parts of "Freon-12" and "Freon-11." The ratios, of course, can be varied to give a more effective vapor pressure to the final aerosol composition, for example, at from about 30 to about 75 pounds per square inch at about 70° F. In some cases, for example, there may be used two parts of "Freon-12" to one part of "Freon-11."

Then each hair fixative formulation of any of the Examples 6–12 and of any of the directly thereafter described modifications thereof can be considered as being admixed with from about 2 to about 9 times its volume of any aerosol propellant such as "Freon-12", "Freon-114", or suitable mixture of "Freon-12" with "Freon-114" or "Freon-11," or other effective mixture of the type described herein and having an effective vapor pressure, for example, from about 30 to 75 pounds per square inch, at 70° F., or in any other proportion yielding a final complete composition containing from about 10 to about 35 percent by volume of a film-forming hair fixative formulation of any of Examples 6–12 and of any of the hereinabove described modifications of any of those examples.

What is claimed is:

1. A 5,5-di(lower)alkylhydantoin-formaldehyde-acetaldehyde terpolymer, wherein each lower alkyl group has from one to two carbon atoms and the acetaldehyde, formaldehyde, and hydantoin moieties are in the ratio of from about 0.05 to about 0.5 mol of the acetaldehyde moiety per about 0.5 mol of the formaldehyde moiety per mol of the dialkylhydantoin moiety.

2. A terpolymer as claimed in claim 1, wherein said acetaldehyde, formaldehyde and hydantoin moieties are in the ratio of from about 0.5 mol of the acetaldehyde moiety to about 0.5 mol of the formaldehyde moiety to about one mol of the dialkylhydantoin moiety.

3. A terpolymer as claimed in claim 1, wherein each said lower alkyl group is methyl.

4. A terpolymer as claimed in claim 3, wherein the ratio of said moieties is about 0.3 mol of the acetaldehyde moiety per about 0.7 mol of the formaldehyde per mol of the dialkylhydantoin moiety.

5. A terpolymer as claimed in claim 1, wherein one lower alkyl group is methyl and the other is ethyl.

6. A terpolymer as claimed in claim 5, wherein the ratio of said moieties is about 0.3 mol of the acetaldehyde moiety per about 0.7 mol of the formaldehyde per mol of the dialkylhydantoin moiety.

7. A terpolymer as claimed in claim 1, wherein each of said lower alkyl group is ethyl.

References Cited
UNITED STATES PATENTS

| 2,101,332 | 12/1937 | Frankenburger et al. | 260—130 |
| 2,155,863 | 4/1939 | Jacobson | 260—69 |

FOREIGN PATENTS

| 906,651 | 3/1954 | Germany | 260—67.5 |

WILLIAM H. SHORT, Primary Examiner

R. J. KOCH, Assistant Examiner

U.S. Cl. X.R.

260—29.4 R; 424—47, 71, DIG 1, DIG 2

UNITED STATES PATENT OFFICE
CERTIFICATE OF CORRECTION

Patent No. 3,649,597        Dated March 14, 1972

Inventor(s) William O. Henley, Jr.

It is certified that error appears in the above-identified patent and that said Letters Patent are hereby corrected as shown below:

Column 3, line 18, "on-eighth" should read -- one-eighth --; line 24, "methylethydantoin" should read -- methylethylhydantoin --. Column 5, line 10, "EX-50" should read -- EX-5 --; line 11, "sillcone" should read -- silicone --; line 22, "sillcone" should read -- silicone --. Column 7, line 12, after "about" should read -- 0.95 to about --

Signed and sealed this 7th day of November 1972.

(SEAL)
Attest:

EDWARD M. FLETCHER, JR.
Attesting Officer

ROBERT GOTTSCHALK
Commissioner of Patents